US011650106B2

(12) United States Patent
Cavanaugh et al.

(10) Patent No.: US 11,650,106 B2
(45) Date of Patent: May 16, 2023

(54) TEMPERATURE PROBE WITH IMPROVED RESPONSE TIME

(71) Applicant: Rosemount Inc., Shakopee, MN (US)

(72) Inventors: Jack M. Cavanaugh, Edina, MN (US); Nathan S. Loya, Edina, MN (US)

(73) Assignee: Rosemount Inc., Shakopee, MN (US)

( * ) Notice: Subject to any disclaimer, the term of this patent is extended or adjusted under 35 U.S.C. 154(b) by 231 days.

(21) Appl. No.: 17/137,648

(22) Filed: Dec. 30, 2020

(65) Prior Publication Data
US 2022/0205847 A1   Jun. 30, 2022

(51) Int. Cl.
*G01K 7/16*   (2006.01)
*G01K 7/06*   (2006.01)

(52) U.S. Cl.
CPC   *G01K 7/16* (2013.01); *G01K 7/06* (2013.01)

(58) Field of Classification Search
CPC ... H01C 7/10; H01C 7/13; H01C 7/02; H01C 7/04; H01C 3/04; G01K 7/16; G01K 7/06
See application file for complete search history.

(56) References Cited

U.S. PATENT DOCUMENTS

| | | | | |
|---|---|---|---|---|
| 4,984,904 A * | 1/1991 | Nakano | | G01K 1/08 266/88 |
| 5,147,137 A * | 9/1992 | Thiesen | | G01K 1/125 374/E1.017 |
| 5,438,866 A * | 8/1995 | McQueen | | G01F 23/248 73/204.25 |
| 5,474,618 A * | 12/1995 | Allaire | | H01L 35/32 374/208 |
| 5,483,041 A * | 1/1996 | Peck | | C30B 31/10 392/407 |
| 6,636,950 B1 * | 10/2003 | Mithal | | G06F 9/3857 711/143 |
| 7,036,224 B2 * | 5/2006 | Gul | | G01K 1/08 29/850 |
| 7,458,718 B2 * | 12/2008 | Krishnamurthy | | G01K 13/02 374/185 |
| 7,465,086 B1 * | 12/2008 | Foreman, Jr. | | G01K 1/08 73/866.5 |

(Continued)

FOREIGN PATENT DOCUMENTS

CN   87214110 U   *   7/1988
CN   202177468 U   *   3/2012
(Continued)

OTHER PUBLICATIONS

Search Report and Written Opinion dated Mar. 8, 2022 for International Patent Application PCT/US2021/060063, 12 pages.

*Primary Examiner* — Gail Kaplan Verbitsky
(74) *Attorney, Agent, or Firm* — Christopher R. Christenson; Kelly, Holt & Christenson, PLLC

(57) ABSTRACT

A temperature probe includes a sheath, a temperature sensitive element, and an insert. The sheath has a sidewall defining an interior space therein. The temperature sensitive element is disposed within the interior space of the sidewall and has an electrical characteristic that varies with temperature. The insert, which is formed of silicon carbide, is operably interposed between the sidewall and the temperature-sensitive element. A method of manufacturing a temperature probe is also provided. A temperature sensing system employing a temperature probe is also provided.

20 Claims, 8 Drawing Sheets

(56) References Cited

U.S. PATENT DOCUMENTS

| | | | | |
|---|---|---|---|---|
| 7,719,401 | B2 | 5/2010 | Nyffenegger | |
| 7,855,632 | B1* | 12/2010 | Schuh | G01K 1/08 |
| | | | | 374/185 |
| 8,840,301 | B2* | 9/2014 | Hashemian | G01K 15/005 |
| | | | | 374/142 |
| 8,851,744 | B1* | 10/2014 | Feller | G01K 15/005 |
| | | | | 374/31 |
| 9,846,084 | B2* | 12/2017 | Kim | F27B 17/0016 |
| 9,958,336 | B2* | 5/2018 | Ihle | G01K 7/223 |
| 10,809,213 | B2* | 10/2020 | Daw | G01N 27/002 |
| 2006/0082483 | A1* | 4/2006 | Lan | H03M 1/76 |
| | | | | 341/144 |
| 2007/0252672 | A1* | 11/2007 | Nyffenegger | G01K 1/18 |
| | | | | 374/E1.022 |
| 2009/0296781 | A1 | 12/2009 | Weber et al. | |
| 2010/0074298 | A1* | 3/2010 | Nyffenegger | G01K 1/18 |
| | | | | 374/E7.018 |
| 2014/0269820 | A1 | 9/2014 | Perrault et al. | |
| 2016/0178449 | A1* | 6/2016 | Goedel | G01K 1/08 |
| | | | | 374/185 |

FOREIGN PATENT DOCUMENTS

| | | | | |
|---|---|---|---|---|
| CN | 203443691 U | * | 2/2014 | |
| CN | 204188292 U | * | 3/2015 | |
| JP | 63170901 A | * | 7/1988 | |
| JP | 2016-045188 A | | 4/2016 | |
| WO | 92-02794 A1 | | 2/1992 | |
| WO | WO-0120269 A1 | * | 3/2001 | G01F 1/684 |
| WO | WO-2016065344 A1 | * | 4/2016 | G01K 1/08 |

\* cited by examiner

TEMPERATURE PROBE WITH IMPROVED RESPONSE TIME

BACKGROUND

Temperature probes are used in a variety of industries and environments to provide an indication of temperature of a substance or surface, such as a process fluid flowing in a process fluid conduit, such as a pipe. A temperature probe generally includes an outer sheath that is formed of metal, ceramic or glass and that protects the temperature sensitive element, located inside the sheath, from impacts and exposure to process fluids or the like. Non-conductive powder, such as Magnesium Oxide (MgO) or ceramic (such as Alumina Oxide—$Al_2O_3$) is usually used to fill the space between the inner surface of the sheath and the temperature sensitive element.

Temperature probes have a variety of design considerations that must be considered for applicability to a particular application. Among these considerations are accuracy, thermal operating range, and response time. A fast response time is a very important consideration in a number of high-precision industries, such as pharmaceuticals, food and beverage production, and custody transfer of goods. Providing a temperature probe with an improved response time would allow such temperature probes to be used in more applications, and particularly applications that require fast response times.

SUMMARY

A temperature probe includes a sheath, a temperature sensitive element, and an insert. The sheath has a sidewall defining an interior space therein. The temperature sensitive element is disposed within the interior space of the sidewall and has an electrical characteristic that varies with temperature. The insert, which is formed of silicon carbide, is operably interposed between the sidewall and the temperature-sensitive element. A method of manufacturing a temperature probe is also provided. A temperature sensing system employing a temperature probe is also provided.

DETAILED DESCRIPTION OF ILLUSTRATIVE EMBODIMENTS

Figure 1:
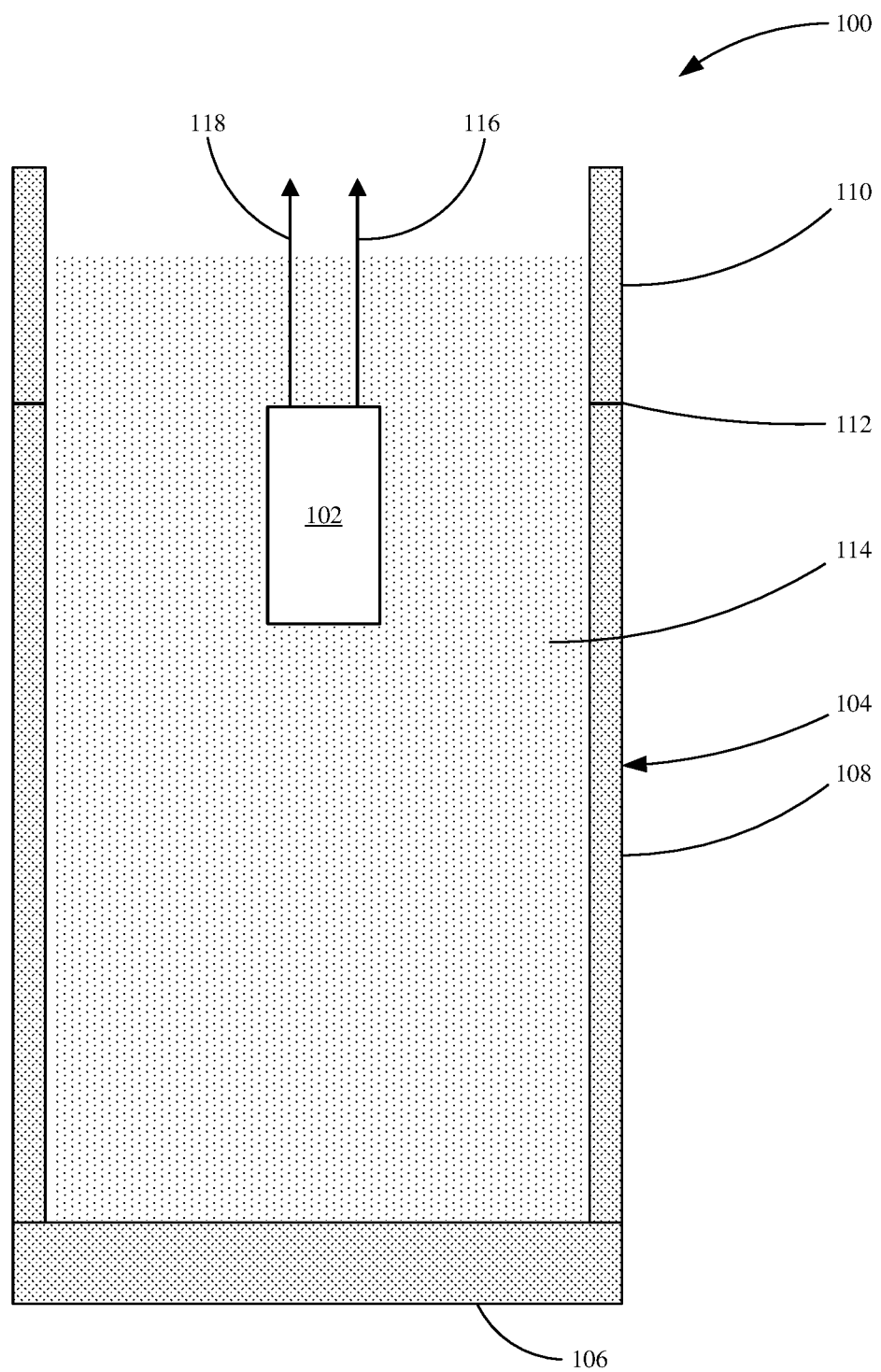
FIG. 1 is a diagrammatic view of a portion of an RTD-based temperature probe in accordance with the prior art.

FIG. 1 is a diagrammatic view of a portion of an RTD-based temperature probe in accordance with the prior art. Probe 100 generally includes an RTD element 102 disposed within a metallic sheath 104 having a metallic end 106. Together sidewall 108 and end 106 form an end assembly of temperature probe 100. The end assembly is welded to, or otherwise coupled to sheath sidewall 110 at weld 112. An insulative powder, such as magnesium oxide (MgO), is disposed within sheath 104 and generally maintains the position of RTD element 102 within sheath 104. RTD element 102 can be formed in accordance with any suitable RTD element forming processes, such as thin film technology, or wire wound technologies. In either case, a circuit is provided formed of a metal that has a resistance that generally changes in response to temperature changes. Examples of such metals include platinum, copper, and nickel. Two or more conductors 116, 118, extend through insulative powder 114 and couple element 102 to appropriate measurement circuitry (not shown).

Figure 2A:
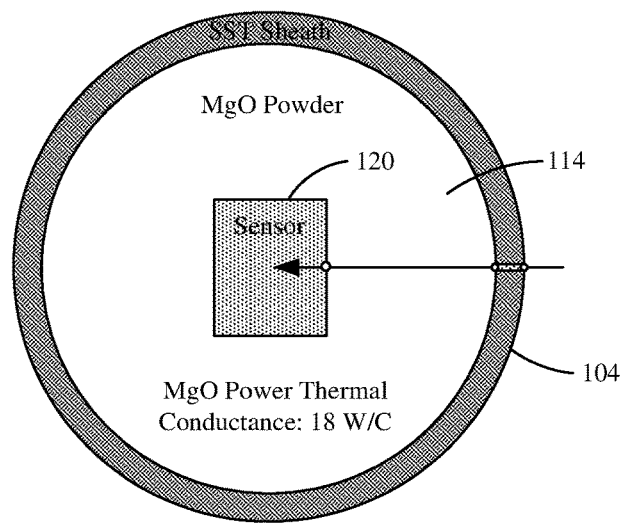
FIGS. 2A and 2B are diagrammatic cross-sectional views of portions of RTD-based temperature probes in accordance with the prior art.
Figure 2B:
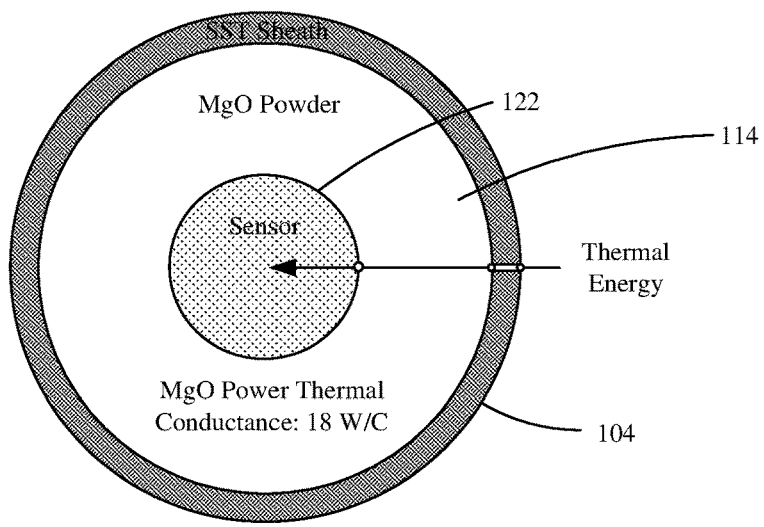

FIGS. 2A and 2B are cross sectional views of RTD-based temperature probes in accordance with the prior art. As shown in FIG. 2A, a rectangular RTD element 120 is positioned within MgO powder 114 within sheath 104. Rectangular RTD element 120 may be formed in accordance with thin film deposition techniques where the metal is sputtered or otherwise deposited on a non-conductive substrate, such as silicon. In FIG. 2B, a circular wire-wound RTD sensor element 122 is positioned within MgO powder 114 within sheath 104. In each case, in order for the temperature from the surface or environment outside of sheath 104 to be detected, thermal energy must flow through the metallic sheath 104 (which can be formed of stainless steel or an Inconel alloy), and through MgO powder 114 in order for the RTD element to generate a detectable temperature change. As can be appreciated, the thermal energy may flow in either direction depending on whether the temperature change is hotter or cooler. In either case, the time required for the thermal energy to transfer will affect the response time of the RTD. As shown in FIGS. 2A and 2B, the thermal conductance of MgO powder is approximately 18 W/C. It is believed that the thermal conductance of the MgO powder, coupled with the distance that the heat must flow through the powder, provides an opportunity to improve thermal response characteristics (i.e., reduce response time) by providing an insulative structure having a higher thermal conductivity than the MgO powder.

Figure 3:
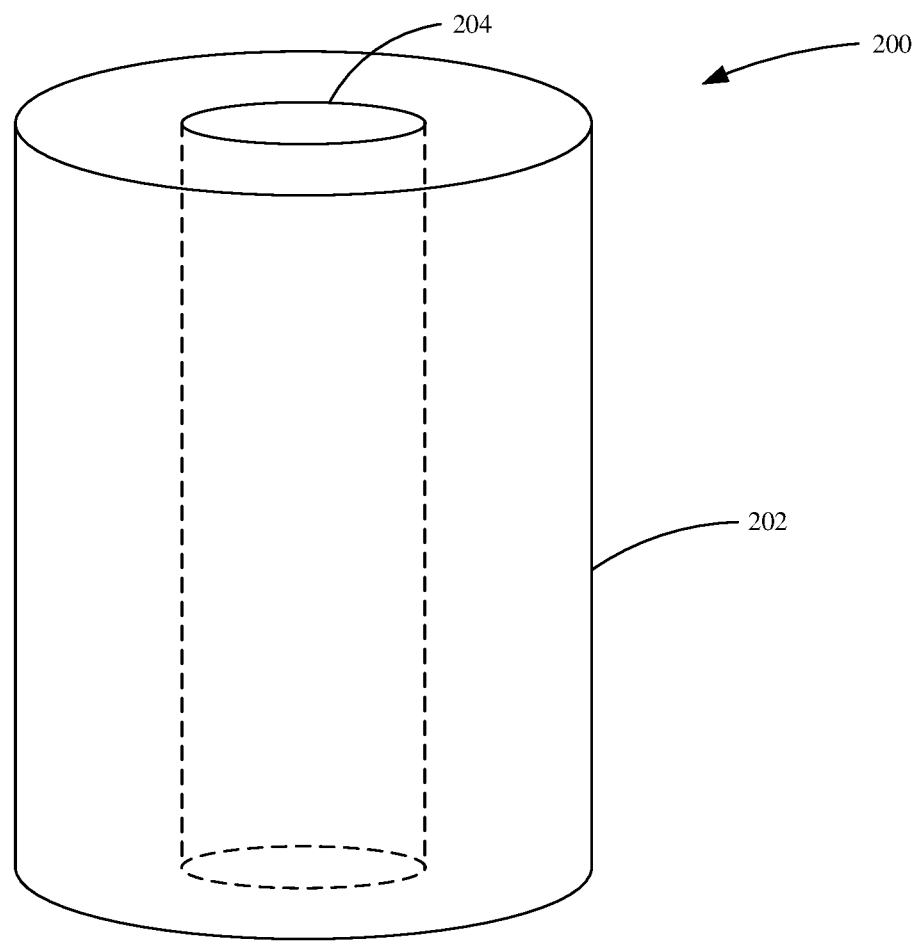
FIG. 3 is a diagrammatic perspective view of a thermal insert for an RTD-based temperature probe in accordance with an embodiment of the present invention.

FIG. 3 is a diagrammatic view of a silicon carbide insert for a temperature probe in accordance with an embodiment of the present invention. Silicon carbide insert 200 generally has a cylindrical shape with an outer diameter 202 that is sized to fit within an inner diameter of a stainless-steel sheath 104 (shown in FIG. 1). Additionally, insert 200 also includes an interior bore 204 that is sized to receive a temperature sensitive element, such as an RTD sensor element, indicated diagrammatically at reference numerals 120, or 122 (shown in FIGS. 2A and 2B). The temperature sensitive element has an electrical characteristic that varies with temperature. In the case of an RTD, the characteristic is resistance and in the case of a thermocouple, the characteristic is voltage. When a thin film RTD sensor element is used (such as square thin film element 120) bore 204 of insert 200 is sized to circumscribe the square shape of sensor 120. Similarly, when wire-wound RTD sensor element 122 is used, bore 204 is sized such that the outer diameter of wire-wound RTD sensor 122 will pass through inner bore 204 of insert 200.

Figure 4:
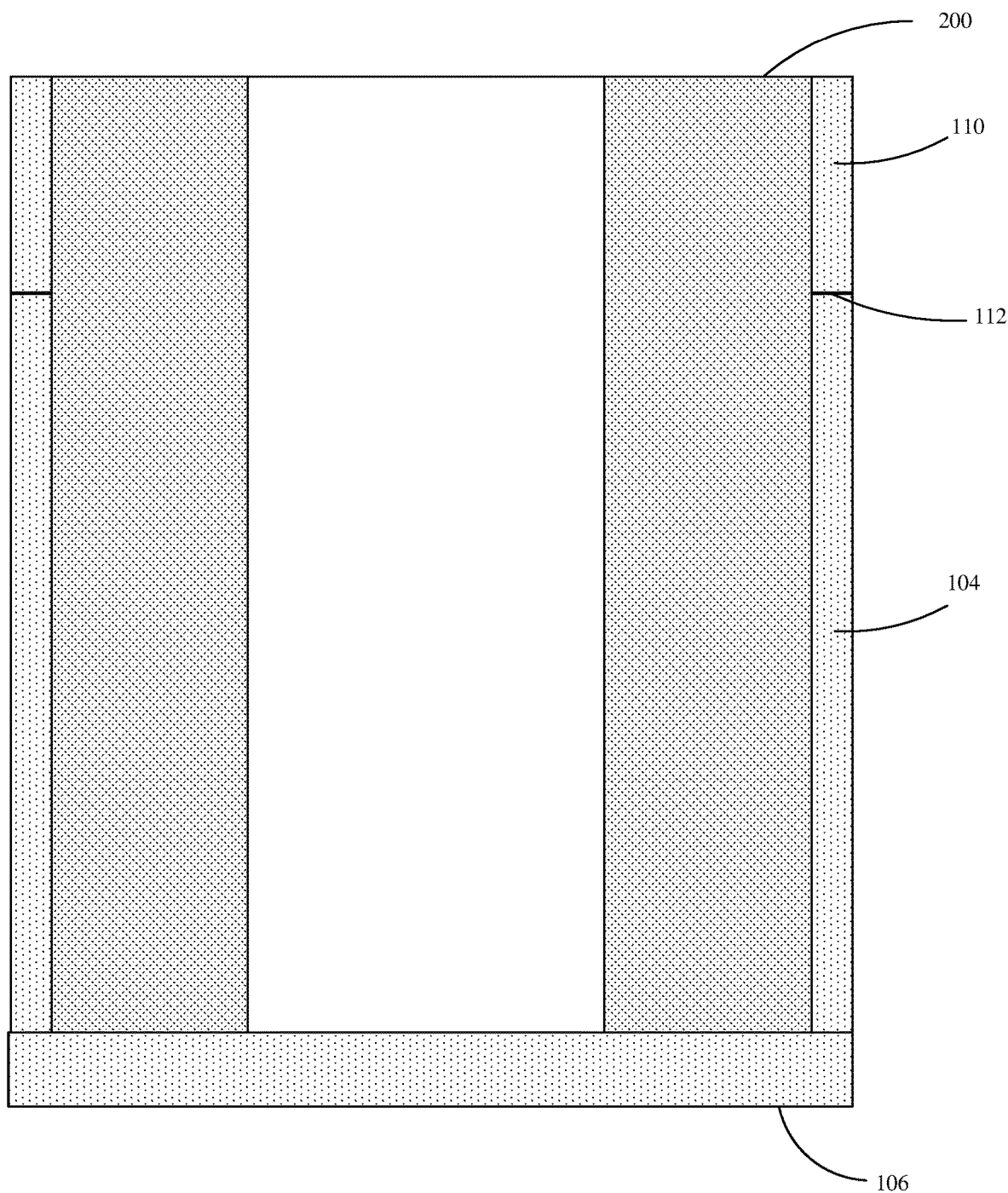
FIG. 4 is a diagrammatic view of a thermal insert disposed within a stainless-steel sheath in accordance with an embodiment of the present invention.

FIG. 4 is a diagrammatic view of silicon carbide insert 200 disposed within a stainless-steel sheath 104 in accordance with an embodiment of the present invention. In the construction of sheath 104, the endcap portion bound by end cap 106 is typically welded to the cylindrical sidewall 110 at weld 112. This is an area of potential weakness in the sheath. In accordance with one aspect of the present invention, insert 200 extends from end cap 106 to a location beyond weld 112. In this way, the rigidity of carbide insert 200 also provides strength to the temperature probe at the location of weld 112. This provides a more robust structure in that weld 112 is sometimes the source of wear or breakage in prior art devices.

Figure 5:
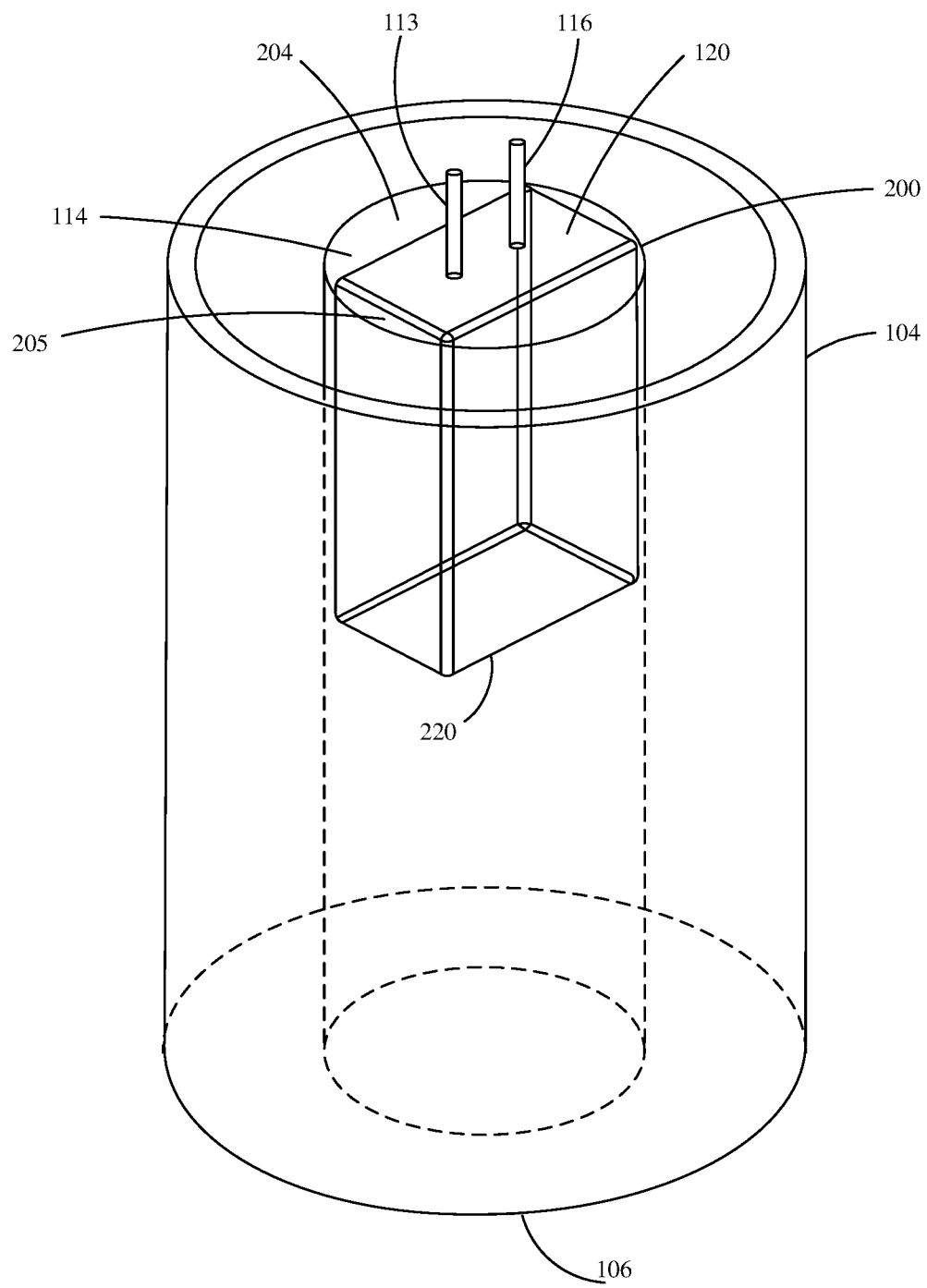
FIG. 5 is a diagrammatic view of an RTD-based temperature probe in accordance with an embodiment of the present invention.

FIG. 5 is a diagrammatic view of an RTD-based temperature probe in accordance with an embodiment of the present invention. Thin film RTD sensor element 120 is disposed within bore 204 of silicon carbide insert 200. Further, a quantity of MgO powder 114 is provided between inner diameter 204 of silicon carbide insert 200 and the exterior surface 205 of thin film RTD sensor element 120. Further, additional MgO powder 114 is located below and supports lower surface 220 of RTD sensor element 120 above end cap 106.

The selection of silicon carbide for the material of insert 200 is based on a careful balance of various design constraints. Materials within the temperature probe must withstand reasonably high temperatures, must not create a galvanic cell with the sheath material, and must be able to withstand reasonable thermal and mechanical shock. Further, such materials must be able to be used at prices that maintain the economic feasibility of the overall design. Silicon carbide meets the stringent material property requirements needed in such as a temperature probe, and provides a 200 W/m*K thermal conductivity that far exceeds that of materials commonly used in RTD probe construction. For comparison, MgO powder has a thermal conductivity of 60 W/m*K. The specific heat of MgO powder is 0.880 J/g*K with an electrical resistivity greater than $10^{14}$ ohms*Cm @ 20 degrees C. The density of MgO powder is also approximately 3.6 grams/cm³. In contrast, silicon carbide has a thermal conductivity of 200 W/m*K with a specific heat of 0.67 J/g*K and an electrical resistivity of $10^8$ ohms*Cm @ 20 degrees C. The density of silicon carbide is 3.2 grams/cm³.

In the following analysis of response time comparisons, Equations 1-3, set forth below, are useful.

$$Q = \frac{t_1 - t_2}{R_{total}} \quad \text{Equation 1}$$

In Equation 1, Q represents heat flow across a total thermal resistance $R_{total}$ with a temperature differential $t_2-t_1$.

$$R_{cylinder} = \frac{\ln(r_2/r_1)}{2\pi L k} \quad \text{Equation 2}$$

In Equation 2, $R_{cylinder}$ is the thermal resistance through the walls of a cylinder having an inner radius $r_1$ and an outside radius $r_2$ where L is the length of the cylinder and k is the thermal conductivity of the material.

$$C_{total} = \frac{1}{R_{total}} \text{ or } R_{total} = \frac{1}{C_{total}} \quad \text{Equation 3}$$

Equation 3 defines total conductance $C_{total}$ and the inverse of total thermal resistance $R_{total}$.

For heat flow comparisons, in the prior art, the heat from the environment generally flows through the thermal resistance of the sheath then flow through the thermal resistance of the MgO powder into the RTD sensor element. For embodiments of the present invention that employ thin film RTD sensor element, the thermal heat flow passes through the sheath, through the silicon carbide insert, and through a relatively small amount of MgO powder between the inner bore of the silicon carbide insert and the thin film sensor.

For wire-wound sensor embodiments of the present invention, the heat flow through the prior art MgO is simply replaced with heat flow directly through the silicon carbide insert.

For comparison sake, specific prototypes and dimensions are used in order to illustrate the differences in heat flow and response time. In the following examples, a stainless-steel sheath was used having an outside diameter of 5.95 mm and an inside diameter of 5.35 mm with a length of 28 mm. This provides a thermal resistance across the sheath $R_{sheath}$ of 0.0403 C/W.

For comparing thin film embodiments, the prior art MgO powder also has an outside diameter of 5.35 mm and an inside diameter of 3.0 mm and a length of 28 mm for a thermal resistance of 0.0548 C/W. In contrast, a silicon carbide insert having precisely the same dimensions has a thermal resistance of 0.0164 C/W or in other words a thermal conductance of 60.7934. This provides a 70% decrease in overall thermal resistance.

Figure 6A:
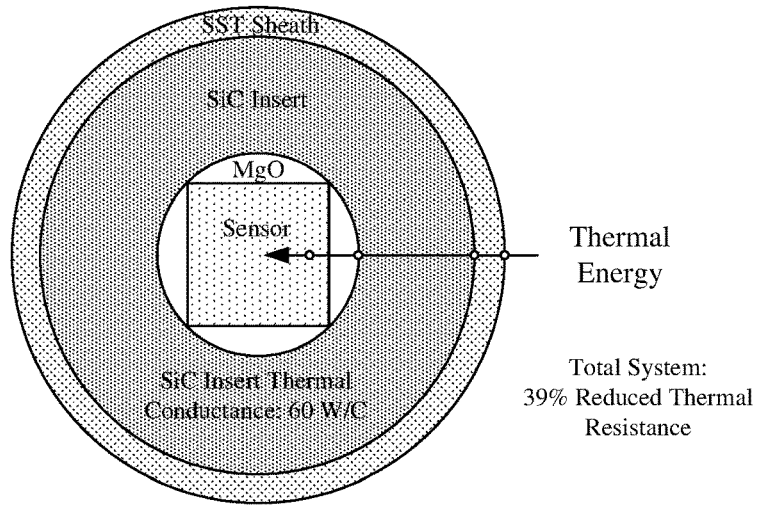
FIGS. 6A and 6B are diagrammatic cross-sectional views of portions of RTD-based temperature probes in accordance with embodiments of the present invention.
Figure 6B:
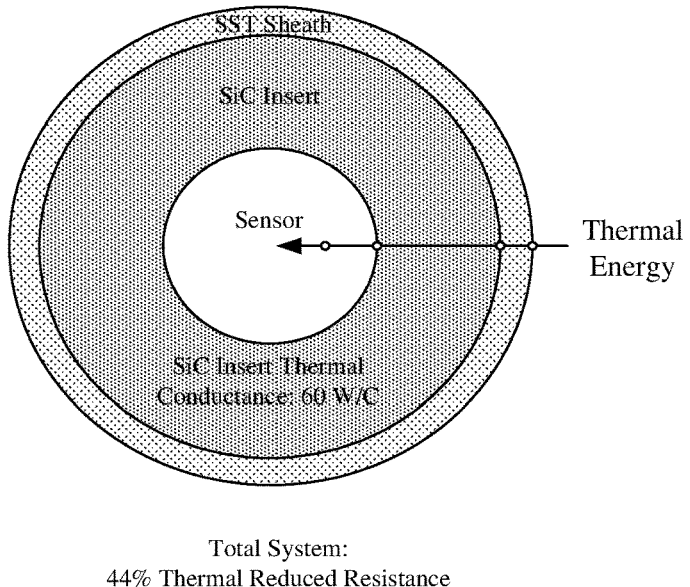

Using a silicon insert with a 3.0 mm inside diameter will still require a small amount of MgO powder to fill the space between the rectangular sensor element and the inside diameter of the silicon insert. The outside diameter of this MgO is the same and the inside diameter of the insert (3.0 mm) and the inside diameter of the MgO is 2.95 mm. This yields an MgO thermal resistance of 0.0016 C/W which is added to the thermal resistance of the silicon carbide insert (0.0164 C/W) and $R_{sheath}$ (0.0403) provides a total thermal resistance $R_{total}$ of 0.0583 C/W. This is a 38.67% reduction from thin film-based RTD sensors that employ only MgO powder and do not use a silicon carbide insert, as shown in FIG. 6A Comparing wire-wound embodiments, the improvement provided by a silicon carbide insert is more pronounced. A sheath with an outside diameter of 5.95 mm, inside diameter of 5.35 mm and length of 47 mm was used. This sheath had a thermal resistance of 0.0240 C/W. MgO powder having an outside diameter of 5.35 mm, and inside diameter of 2.60 mm and a length of 47 mm provides a thermal resistance of 0.0407 C/W. Thus, the total thermal resistance of the prior art system is 0.0647 C/W. When a silicon carbide insert is used having the same dimensions as the MgO powder, the thermal resistance of the insert is 0.0122 C/W for a total thermal resistance of 0.0362 C/W. This provides a 44.05% decrease in $R_{total}$, as shown in FIG. 6B. These decreases in thermal resistance of embodiments of the present invention provide quicker response times for the overall RTD-based temperature probe.

Silicon carbide is composed of tetrahedra of carbon and silicon atoms with strong bonds in the crystal lattice. This produces a very hard and strong material. Silicon carbide is not attacked by any acids or alkalis or molten salts up to 800° C. In air, silicon carbide forms a protective silicon oxide coating at 1200° C. and is able to be used up to 1600° C. The high thermal conductivity coupled with low thermal expansion and high strength give this material exceptional thermal shock resistant qualities. Silicon carbide ceramics with little or no grain boundary impurities maintain their strength to very high temperatures approaching 1600° C. with no strength lost. Chemical purity, resistance to chemical attack at temperature, and strength retention at high temperatures has made this material very popular as wafer tray supports and paddles in semiconductor furnaces. The electrical conduction of the material has led to its use in resistance heating elements for electric furnaces and as a key component in thermistors and varistors.

Figure 7:
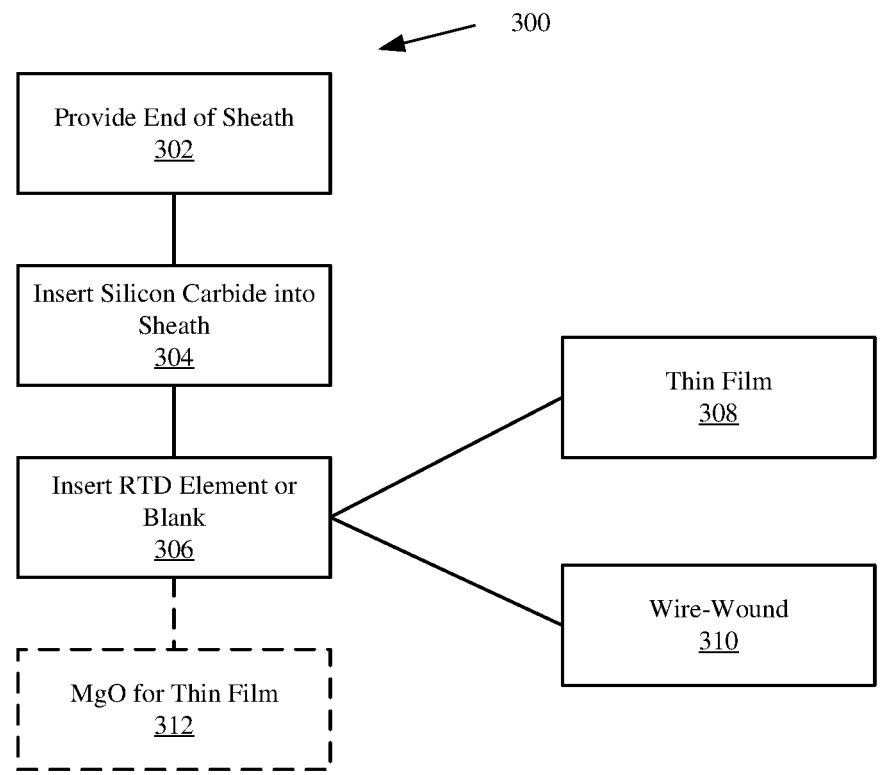
FIG. 7 is a flow diagram of a method of manufacturing an RTD-based temperature probe in accordance with an embodiment of the present invention.

Returning to FIG. 5, silicon carbide insert 200 is generally pressed into the hot end sheath of a temperature probe. The outside diameter of insert 200 is matched to the inside diameter of the probe sheath, and the inside diameter of the silicon carbide insert is sized to be slightly larger than the sensor element (thin film or wire-wound). For thin film elements, the remaining volume is filled with MgO powder to secure the sensing element in the center of the assembly. In some embodiments, a solid blank may be chosen so that there is an opportunity to customize the pocket to each individual element's geometry. This customization could be implemented in a late stage of the manufacturing process. This would enable manufacturing to collect waste MgO powder and reuse it in filling of the cavity. Further, if a solid insert is used, it could be employed with a backstop or blind hole to improve the consistency and repeatability of element placement. Providing the MgO (standard magnesia powder) in the remaining void after the RTD element is installed allows for the thermal continuity as well as rigid internal construction. MgO will also compensate for any geometry variation of the sensing element FIG. 7 is a flow diagram of a method of manufacturing an RTD-based temperature probe in accordance with an embodiment of the present invention. Method 300 begins at block 302 where an end of a sheath is provided. As shown in FIG. 1, the end has an end cap 106. Next, at block 304, a silicon carbide insert is pressed or otherwise positioned within the sheath. In one embodiment, the length of the silicon carbide insert is selected to extend from an end cap of the sheath to a location beyond any end cap/sidewall weld in the sheath. Next, at block 306, an RTD element or a blank is disposed within the silicon carbide insert. As shown in FIG. 7, the RTD element may be a thin film element 308 or a wire-wound element 310, or a suitable solid blank shaped and sized like one of elements 308/310. In embodiments that employ the thin film sensor 310, MgO powder is provided at block 312 to fill the area between the inside diameter of the silicon carbide insert and the outside surface of the thin film RTD sensor element.

While embodiments of the present invention are particularly applicable to providing a silicon carbide insert within legacy stainless-steel sheaths, given the strength of the silicon carbide insert, it is also expressly contemplated that the wall thickness of the stainless-steel or other suitable metal may be able to be reduced thus further reducing the response time of the temperature probe.

While embodiments of the present invention have been described with respect to temperature probes, embodiments could also be used to improve thermal conductivity and response time of thermowells. This could be accomplished by replacing a material segment of the thermowell with a silicon carbide insert at the bottom of the thermowell and implementing the idea on the outside diameter of inserted probe.

Figure 8:
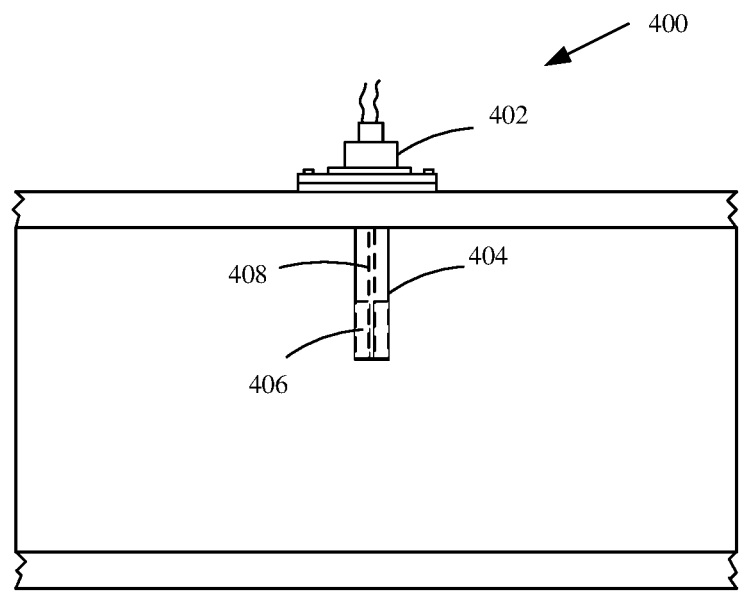
FIG. 8 is a diagrammatic view of a thermal insert applied to a thermowell in accordance with an embodiment of the present invention.

FIG. 8 is a diagrammatic view of a thermal insert applied to a thermowell in accordance with an embodiment of the present invention. Thermowell system 400 includes a thermowell 402 having a distal portion 404 that extends into a process fluid conduit or other suitable structure to measure a temperature. The distal portion is generally cylindrical and has an interior that is able to receive a temperature probe assembly 408, such as the prior art probe assembly shown in FIG. 1, or the silicon carbide-based arrangements described herein. In accordance with a further aspect of the present invention, the distal portion 404 of thermowell 402 may also include a silicon carbide insert 406 to further reduce response time of the thermowell system 400.

Further, embodiments described herein could also be implemented for hygienic sensors with a similar insert sensor placement at the end of a tip of the sensor. Further still, improvements to legacy sensors can be provided with minimal efforts and could be used with a significant number of sensor configurations and elements.

Although the present invention has been described with reference to preferred embodiments, workers skilled in the art will recognize that changes may be made in form and detail without departing from the spirit and scope of the invention. For example, while embodiments are generally described with respect to RTDs, embodiments described herein are applicable to any type of temperature sensitive element including, without limitation, thermocouples, thermistors, and semiconductor-based integrated circuits.

What is claimed is:

1. A temperature probe comprising:
    a metallic sheath having a sidewall defining an interior space therein;
    an RTD element disposed within the interior space of the sidewall, the RTD element having an electrical characteristic ne varies with temperature, and
    an insert operably interposed between the sidewall and the RTD element, the insert being formed of silicon carbide.

2. The temperature probe of claim 1, wherein the insert has a cylindrical shape and art outer diameter positioned adject an inner diameter of the sidewall of the metallic sheath.

3. The temperature probe of claim 2, wherein the RTD element is a wire-wound RTD element having a cylindrical shape With an outer diameter disposed proximate an inner diameter of the insert.

4. The temperature probe of claim 2, wherein the RTD element is a thin film RTD element having a rectangular shape, wherein the thin film RTD element is disposed within art inner diameter of the insert.

5. The temperature probe of claim 4, and further comprising insulative powder disposed in spaces between the inner diameter of the insert and the rectangular surface of the thin film RTD element.

6. The temperature probe of claim 5, and wherein the insulative powder spaces the thin film RTD element front a distal end of the metallic sheath.

7. The temperature probe of claim 2, wherein the sheath includes an endcap portion welded to the sidewall, and whereM the insert has a length that is, greater than a distance from a distal end of the metallic sheath to the weld.

8. A method of manufacturing a temperature probe, the method comprising:
    providing a metallic sheath having an end;

positioning a silicon carbide insert within the metallic sheath, the silicon carbide insert having a bore extending at least partially therethrough;

inserting an RTD element into, the bore of the silicon carbide insert.

9. The method or claim 8, wherein positioning the silicon carbide insert is pressed into the metallic sheath.

10. The method of claim 8, wherein the RTD element is a thin film RTD element.

11. The method of claim 10, and further comprising filling space between a rectangular shape of the thin film RTD element and an inner diameter of the bore of the insert with insulative powder.

12. The method of claim 11, wherein the insulative powder is magnesium oxide (MgO) powder.

13. The method of claim 8, wherein the temperature-sensitive element is a solid blank, that is sized and shaped like an RTD.

14. A temperature measurement system comprising:

a thermowell having a distal end and a cylindrical sidewall extending therefrom;

an RTD temperature probe having a metallic sheath disposed within the thermowell;

a silicon carbide insert positioned within the thermowell and disposed about, the temperature probe.

15. The temperature measurement system of claim 14, wherein the RTD temperature probe includes:

a metallic sheath having a sidewall defining an interior space therein;

an RTD element disposed within the interior space of the sidewall, the RTD element having an electrical resistance that varies with temperature; and an insert operably interposed between the sidewall and the RTD element, the insert being formed of silicon carbide.

16. The temperature measurement system claim 15, wherein the RTD element is a thin film RTD element.

17. The temperature measurement system of claim 16, and further comprising insulative powder disposed in spaces between a rectangular surface of the thin film RTD element and an inner diameter of the silicon carbide insert.

18. The temperature measurement system of claim 15, wherein the RTD element is a wire-wound RTD element.

19. The temperature measurement system of claim 14, wherein the temperature probe is a thermocouple probe.

20. The temperature measurement system of claim 14, wherein an end cap of the temperature probe is disposed in contact with the distal end of the thermowell.

* * * * *